UNITED STATES PATENT OFFICE.

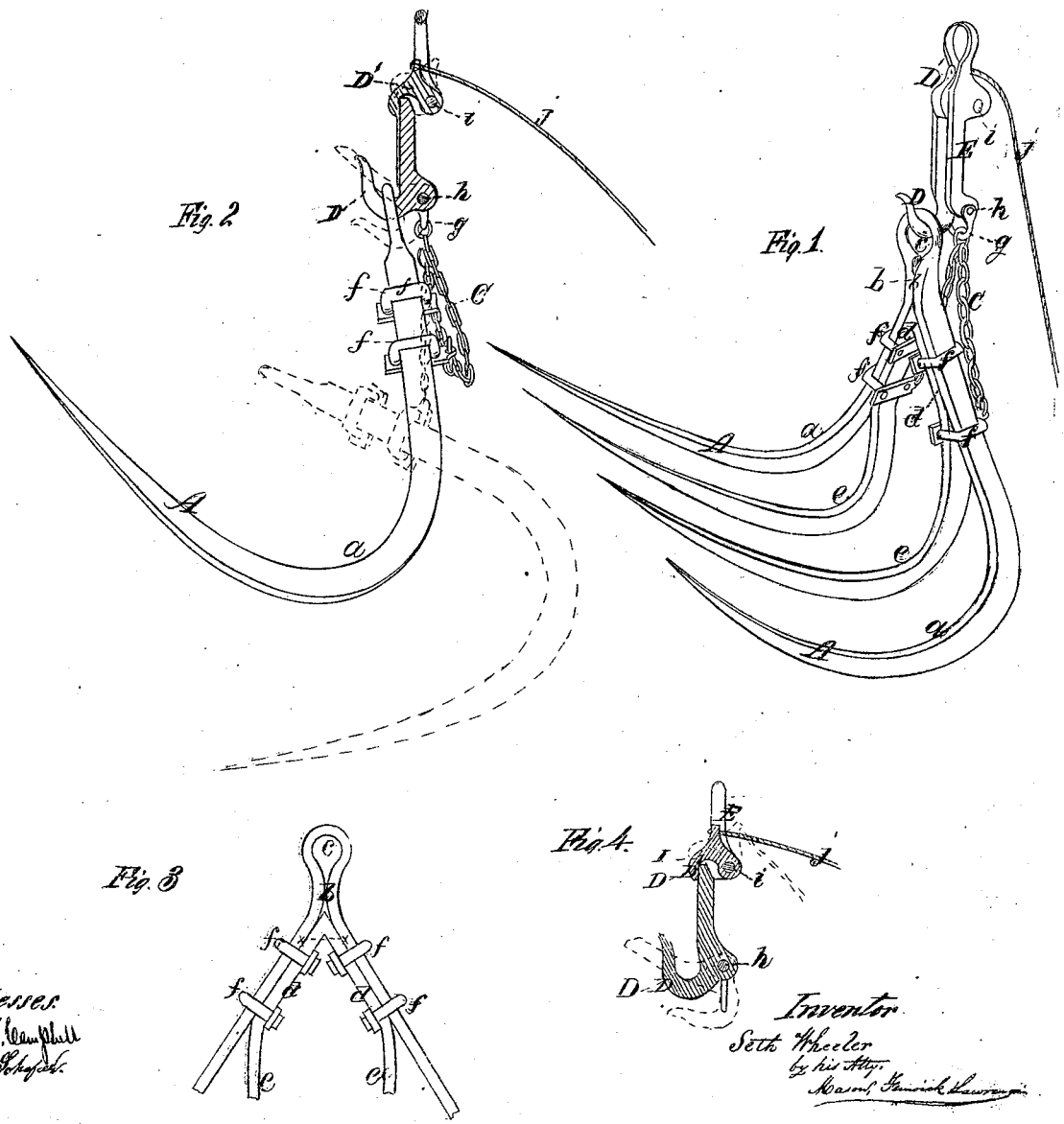

SETH WHEELER, OF ALBANY, NEW YORK.

IMPROVEMENT IN HAY-ELEVATING FORKS.

Specification forming part of Letters Patent No. 41,733, dated February 23, 1864.

*To all whom it may concern:*

Be it known that I, SETH WHEELER, of the city and county of Albany, and State of New York, have invented new and useful Improvement in Horse-Forks Used for Handling Hay, Straw, &c.; and I do hereby declare that the following is a full, clear, and exact description of the same, reference being had to the accompanying drawings, forming part of this specification, in which—

Figure 1 is a perspective view of my invention in one condition. Fig. 2 is a partial section and side elevation of the same. The red lines show it in condition for discharging its load. Fig. 3 is a front elevation of the upper end of the fork proper. Fig. 4 is a vertical section of the releasing contrivance. The red lines show the condition of the parts when the fork is discharging its load.

Similar letters of reference in the several figures indicate corresponding parts.

The object of my invention is to so form that style of horse-fork which has its tines curved upward and diverging from each other from their rear to their front ends that one or more pairs, or a greater number than two, of such tines may be employed in their construction, while at the same time that part of the fork designated as the "upper end" consists of simply an eye, which is either a continuation directly of one or the other of the pairs of tines or an eye-piece made separate from the pairs of tines and introduced between the upper rear ends of the same.

Another object of my invention is to so adapt such a fork and a suspending and releasing contrivance for use together that the fork may be used with great convenience and advantage for elevating hay and other substances to any desired position, and then, at the will of the operator, deposit the same into a barn or wagon or upon a stack.

To enable others skilled in the art to make and use my invention, I will proceed to describe one good practical mode of doing so, and shall also make mention of one or more modifications thereof.

To form the outer or inclosing pair of tines I take a rod of untempered steel (to be afterward tempered) of a length great enough to form two tines and the eye or suspending-loop. This bar is wrought into the form necessary either by rolling in dies or by hammering, and is then bent so as to be curved, as at $a$, and to diverge from $b$ in opposite directions, as shown. Thus bending the rod forms the eye $c$, as well as the tines A A. The next step is to take a similar rod, of somewhat less length, and bring it into the shape represented at $d$ $d$ $e$ $e$, and introduce it between the pair of tines A A, and fasten it by means of loops $f f$, or by rivets or any other means, as represented.

Instead of having the upper termini of the tines $d$ $d$ $e$ $e$ united, the apex represented may be cut off, as illustrated in Fig. 3, at the line $x$ $x$. Again, instead of forming the eye on the tines A A, the tines $d$ $e$ may have the eye formed on them. In that case the upper ends of the tines A A would not stand much higher than the line $x$ $x$ in Fig. 3. Again, it might be found desirable to have the upper ends of the two pairs of tines terminate at the line $x$ $x$ in Fig. 3, and to insert a small malleable-iron eye-piece between the two pairs of tines. I however prefer the plan of construction that is shown in the drawings, and think it possesses greater advantages than any of the modifications suggested.

The releasing and suspending contrivance consists of a chain, C, and a hook, D, with a stop and releasing catch, D'. The chain is attached by its two ends to the tines A A and $d$ $e$ through the lower set of loops, or may be fastened direct to one or the other of the pairs of tines. Thus attached the other part of the chain forms a loop, and this looped chain at its center is connected to the box E of the hook, as shown at $g$. The hook D is pivoted near its lower end, within the box E, as indicated at $h$, and has freedom to turn on said pivot, so as to assume the position shown in red lines when the catch D' is withdrawn. The catch D' is also pivoted in the box E at a point near the upper end of the hook D, as indicated at $i$. This catch, on its under side, is hollowed out so as to fit over the upper end of the hook when in the position shown in black lines, and it is arranged in the box E so as to have freedom to move to the position shown in red lines in Figs. 2 and 4. To the upper end of the catch a cord, $j$, for withdrawing it from contact with the hook, is fastened, and to the loop end of the box E the suspending and elevating apparatus is fastened.

It will be observed that the box E is formed by bending one bar of metal from the center of its length.

It will also be observed that the pivot of the hook answers as the support for the loop to which the chain C is attached. I refer to this simply as it is a cheap mode of constructing the suspending and releasing contrivance.

The operation of the invention is so manifest from the drawings that it will be sufficient to say that the apparatus while receiving or taking its load is in the position and condition shown by black lines in Figs. 1 and 2, and when it is elevated to the proper point and is discharging the load it is in the condition shown by red lines in Fig. 2. In the first condition the catch D' is depended upon as the means of detention; but in the second condition the weight of the load is relied upon to produce the change of position from a retaining to a discharging one; but this weight can never produce this change so long as the catch D remains in the position shown in black in Figs. 1, 2, and 4, it being necessary to withdraw said catch to the position shown in red in order to release the fork.

I wish it to be distinctly understood that my hay-elevating fork is to be constructed without a cross-head, as commonly; also, that the tines of my fork are to be constructed in a form adapted to elevating hay; and, likewise, that my fork singly is to operate as hay-elevator, its construction being such that a duplicate fork arranged to approach toward it in order to retain the hay is not necessary. Finally, that my fork is not intended as a hand-pitchfork, but is to be used as a horse-fork; and my invention relates to a modification of the forks adapted for such use.

What I claim as my invention, and desire to secure by Letters Patent, is—

1. A horse-fork for handling hay and other substances, constructed with curved teeth or tines which converge toward one another, and are united so as to dispense with the ordinary cross-head and yet afford a suspending loop or eye, substantially as and for the purposes set forth.

2. Attaching the tines $d\ d\ e\ e$ to the tines $A\ a\ a$, in the manner described.

SETH WHEELER.

Witnesses:
S. H. H. PARSONS,
B. W. WOOSTER.